(12) United States Patent
Handa et al.

(10) Patent No.: US 8,660,697 B2
(45) Date of Patent: Feb. 25, 2014

(54) SHAPE DETECTION SYSTEM

(75) Inventors: Hiroyuki Handa, Fukuoka (JP);
Takeshi Arie, Fukuoka (JP); Yuji Ichimaru, Fukuoka (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 407 days.

(21) Appl. No.: 12/818,153

(22) Filed: Jun. 18, 2010

(65) Prior Publication Data
US 2010/0324737 A1 Dec. 23, 2010

(30) Foreign Application Priority Data

Jun. 19, 2009 (JP) .............................. P.2009-146947

(51) Int. Cl.
*G06T 7/00* (2006.01)
*B25J 13/08* (2006.01)
(52) U.S. Cl.
USPC ......................................... 700/259; 382/153
(58) Field of Classification Search
CPC ................................................... G06K 9/626
USPC .............................. 701/259; 700/259; 382/153
See application file for complete search history.

(56) References Cited

U.S. PATENT DOCUMENTS

| | | | | |
|---|---|---|---|---|
| 4,876,728 A * | 10/1989 | Roth | .............................. | 382/153 |
| 5,446,835 A * | 8/1995 | Iida et al. | ...................... | 700/259 |
| 5,579,444 A * | 11/1996 | Dalziel et al. | ................. | 700/259 |
| 5,987,591 A * | 11/1999 | Jyumonji | ...................... | 700/259 |
| 6,328,523 B1 * | 12/2001 | Watanabe et al. | ........ | 414/416.01 |
| 7,062,093 B2 * | 6/2006 | Steger | ........................... | 382/216 |
| 7,084,900 B1 * | 8/2006 | Watanabe et al. | ............... | 348/94 |
| 7,123,992 B2 * | 10/2006 | Ban et al. | ....................... | 700/258 |
| 7,539,339 B2 * | 5/2009 | Tanabe et al. | .................. | 382/146 |
| 7,684,897 B2 | 3/2010 | Watanabe et al. | | |
| 7,822,264 B2 * | 10/2010 | Balslev et al. | ................. | 382/154 |
| 7,957,583 B2 * | 6/2011 | Boca et al. | .................... | 382/154 |
| 7,983,487 B2 * | 7/2011 | Agrawal et al. | ............... | 382/199 |

(Continued)

FOREIGN PATENT DOCUMENTS

| | | |
|---|---|---|
| JP | 07-037094 | 2/1995 |
| JP | 2003-143408 | 5/2003 |

(Continued)

OTHER PUBLICATIONS

Journal article, "Quick Pick", Vision Systems Design, vol. 13, Issue 9, Sep. 1, 2008, retrieved from http://www.vision-systems.com/articles/print/volume-13/issue-9/features/industrial-automation-products/quick-pick.html.*

(Continued)

*Primary Examiner* — James Trammell
*Assistant Examiner* — David Testardi
(74) *Attorney, Agent, or Firm* — Ditthavong Mori & Steiner, P.C.

(57) ABSTRACT

A shape detection system includes a distance image sensor that detects an image of a plurality of detection objects and distances to the detection objects, the detection objects being randomly arranged in a container, a sensor controller that detects a position and an orientation of each of the detection objects in the container on the basis of the result of the detection performed by the distance image sensor and a preset algorithm, and a user controller that selects the algorithm to be used by the sensor controller and sets the algorithm for the sensor controller.

13 Claims, 4 Drawing Sheets

(56) References Cited

U.S. PATENT DOCUMENTS

| | | | |
|---|---|---|---|
| 8,098,928 B2* | 1/2012 | Ban et al. | 382/153 |
| 2002/0106135 A1 | 8/2002 | Iwane | |
| 2004/0013306 A1 | 1/2004 | Lee | |
| 2007/0076946 A1* | 4/2007 | Kunisaki et al. | 382/153 |
| 2008/0181485 A1* | 7/2008 | Beis et al. | 382/153 |
| 2008/0240511 A1 | 10/2008 | Ban et al. | |
| 2008/0253612 A1* | 10/2008 | Reyier et al. | 382/103 |
| 2009/0116728 A1 | 5/2009 | Agrawal et al. | |

FOREIGN PATENT DOCUMENTS

| | | |
|---|---|---|
| JP | 2006-106927 | 4/2006 |
| JP | 2008-246631 | 10/2008 |
| JP | 2009-115783 | 5/2009 |

OTHER PUBLICATIONS

Hohnhaeuser, Benjamin et al., "Object Identification and Pose Estimation for Automatic Manipulation", Proceedings of the International Workshop on Robot Vision, Robot Vision 2001, pp. 52-59.*

SensActive brochure, "Bin-picking", retrieved from http://www.wms-engineering.de/plugins/Downloads/pdf/sensactive_en.pdf with a Google indexing date of Nov. 1, 2008.*

Scape Technologies brochure, "SCAPE Bin-Picker, KUKA KR16", retrieved from http://www.scapetechnologies.com/images/products/Standard_Bin_Picker_product_sheet_2.pdf , Copyright 2008, Scape Technologies A/S.*

VMT brochure, "Auto racking and bin picking in the automotive industry", VMT Pepperl+Fuchs, retrieved from http://files.pepperl-fuchs.com/selector_files/navi/productInfo/doct/tdoct1526a_usa.pdf , Copyright 2008 Pepperl+Fuchs, Inc., Jun. 2008.*

VMT brochure, "Bin picking—3D position recognition with laser measurement technology", VMT Pepperl+Fuchs, retrieved from http://files.pepperl-fuchs.com/selector_files/navi/productInfo/doct/tdoct1490a_eng.pdf , Copyright Pepperl+Fuchs Inc., Apr. 2008.*

Matrox Inspector Release 8.0 brochure, dated 30 Jan 2006, downloaded from http://www.physimetrics.com/pdfs/inspector8.pdf.*

Wikipedia "Feature extraction" web page, dated 18 Jun. 2009, downloaded from http://en.wikipedia.org/w/index.php?title=Feature_extraction&oldid=297132150.*

Schroeter, John P. et al., "Suprim: Easily modified image processing software", Journal of Structural Biology 116, 1996, pp. 131-137.*

VMT brochure, "Bin picking—3D position recognition with laser measurement technology", VMT Pepperl+Fuchs, retrieved from http://files.pepperl-fuchs.com/selector_files/navi/productInfo/doct/tdoct1490a_eng.pdf , Copyright 2008 Pepperl+Fuchs Inc., Apr. 2008.*

Chinese Office Action for corresponding CN Application No. 201010203146.8, May 3, 2012.

Ikeuchi, "Generating an Interpretation Tree from a CAD Model for 3D-Object Recognition in Bin-Picking Tasks", International Journal of Computer Vision, Jan. 1, 1987, vol. 1, No. 2, pp. 145-165, XP055059951.

Japanese Office Action for corresponding JP Application No. 2010-111445, Apr. 23, 2013.

European Office Action for corresponding EP Application No. 10 166 071.0—1906, Apr. 25, 2013.

* cited by examiner

SHAPE DETECTION SYSTEM

CROSS-REFERENCE TO RELATED APPLICATION

The present application claims priority to Japanese Patent Application No. 2009-146947, filed Jun. 19, 2009. The contents of this application are incorporated herein by reference in their entirety.

BACKGROUND OF THE INVENTION

1. Field of the Invention

The present invention relates to a system for detecting the shape of a workpiece.

2. Description of the Related Art

Recently, techniques for allowing a robot to perform an operation of, for example, taking out a workpiece from a container or the like in which a plurality of workpieces are stored in different positions and orientations have been proposed.

In order for a robot to perform such an operation, it is necessary to quickly and accurately detect three-dimensional shapes of the workpieces arranged in the container or the like. To this end, various techniques have been proposed.

For example, Japanese Patent Laid-Open Publication No. 2009-115783 discloses a method for detecting three-dimensional position and orientation including the steps of determining depth edges and extracting contours, and Japanese Patent Laid-Open Publication No. 2008-246631 discloses a technique for quickly detecting a workpiece having a curved shape.

SUMMARY OF THE INVENTION

According to one aspect of the present invention, a shape detection system includes a distance image sensor that detects an image of a plurality of detection objects and distances to the detection objects, the detection objects being randomly arranged in a container; a sensor controller that detects a position and an orientation of each of the detection objects in the container on the basis of the result of the detection performed by the distance image sensor and a preset algorithm; and a user controller that selects the algorithm to be used by the sensor controller and sets the algorithm for the sensor controller.

BRIEF DESCRIPTION OF THE DRAWINGS

The present invention will be described in further detail with reference to the accompanying drawings wherein.

DETAILED DESCRIPTION OF THE EMBODIMENTS

An embodiment of the present invention will now be described below with reference to the drawings.

Figure 2:
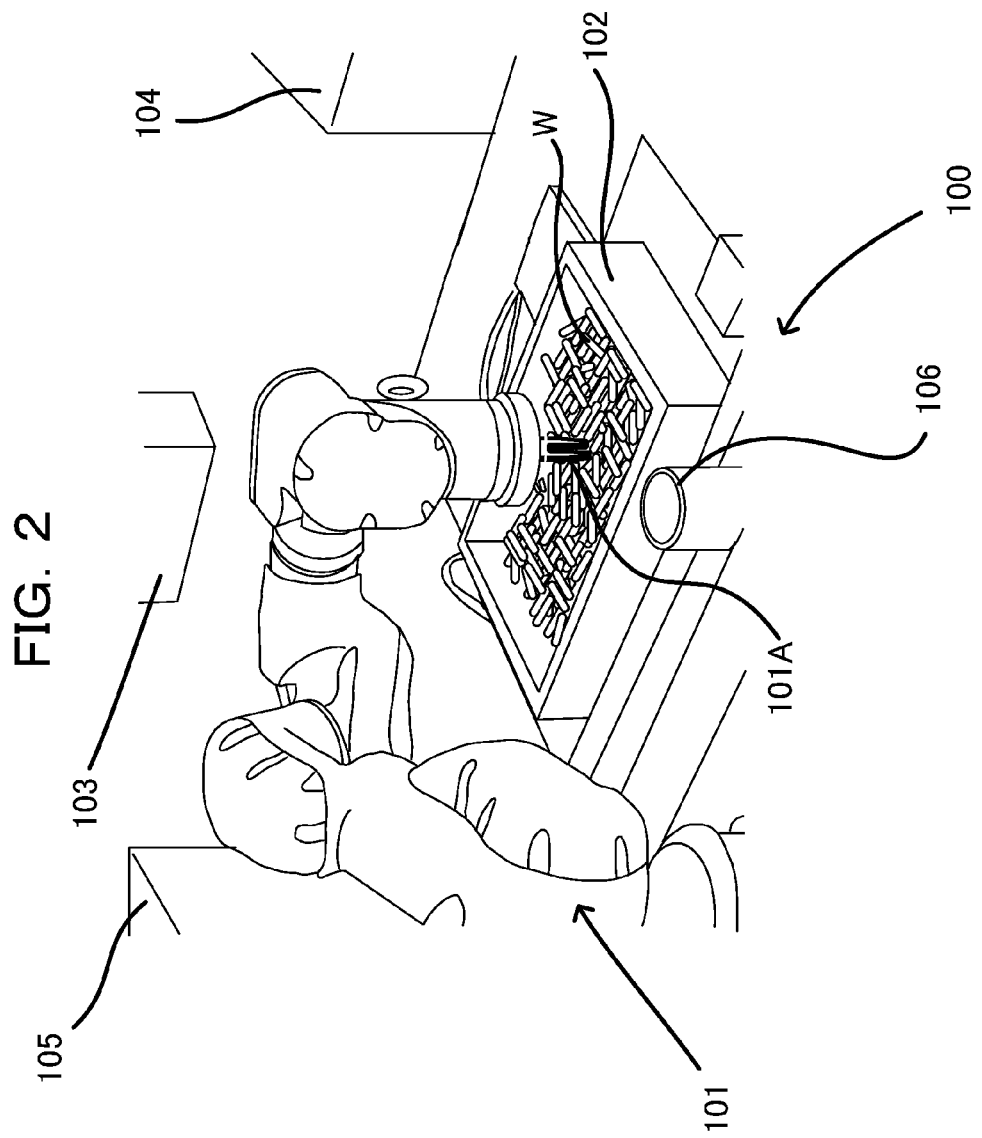
FIG. 2 is a schematic diagram illustrating the overall structure of the system.

As illustrated in FIG. 2, a shape detection system 100 according to the present embodiment includes a robot 101, a container 102, and a shape detection apparatus. The shape detection apparatus includes a distance image sensor unit 103, an external controller (user controller) 104, and a robot controller 105.

The container 102 is a box (palette) formed of resin or metal or the like, and a plurality of workpieces (detection objects) W are disorderly (randomly) arranged in the container 102.

The robot 101 is a vertical articulated robot (The robot doesn't limit to the one of this type, and be possible even by the one of other types). The robot 101 takes the workpieces W out of the container 102 one at a time with a hand device 101A attached to the robot 101 at an end thereof, and places the workpiece W that has been taken out onto a conveying palette 106 for conveying the workpiece W to a section where the next process is performed. The conveying palette 106 is conveyed by a belt conveyor (not shown) to the section where the next process is performed.

Figure 1:
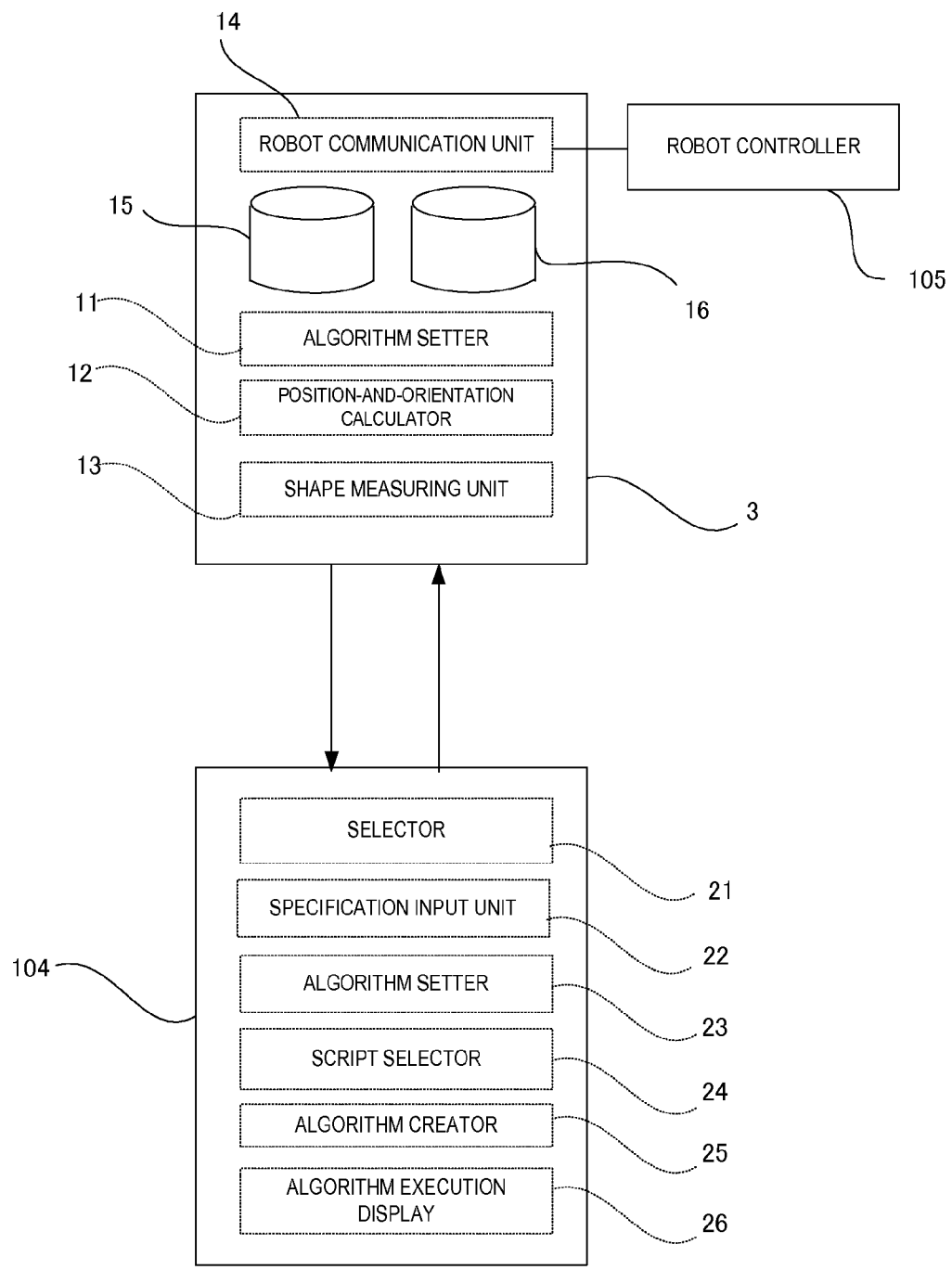
FIG. 1 is a block diagram illustrating the system structure.

A servo motor (not shown) is provided at each joint of the robot 101, and driving of each servo motor is controlled in accordance with operation commands issued in advance by the robot controller 105 (see FIG. 1).

Figure 3:
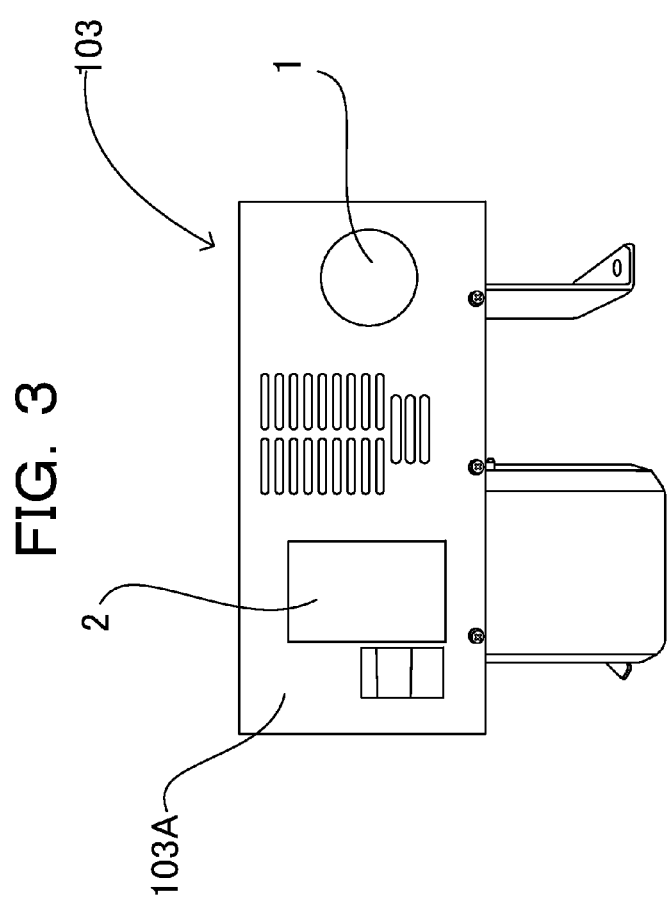
FIG. 3 is a schematic bottom view of a sensor unit.

As illustrated in FIG. 3, the sensor unit 103 includes a camera 1 and a laser distance sensor 2. In addition, a sensor controller 3, which includes a storage device and a calculator, is disposed in a housing 103A of the sensor unit 103. The laser distance sensor 2 causes a laser slit beam emitted from a slit laser to be incident on a mirror, and rotates the mirror with a motor. Accordingly, objects arranged in a large area can be irradiated with the laser slit beam. The laser slit beam incident on the objects is reflected by the objects, and the reflection light is received by the camera 1. The camera 1 determines distances to the objects for each pixel on the basis of the principle of triangulation using the rotation angle of the motor, positions of the image-pickup elements in the camera 1, and the positional relationship between the laser, the mirror, and the camera. Thus, a distance image, which is distance information for each pixel, is obtained.

The external controller 104 is a personal computer that includes a display device, an input device, a storage device, and a calculator, and is connected to the sensor controller 3 such that data can be transmitted therebetween.

As illustrated in FIG. 1, the sensor controller 3 includes an algorithm setter 11, a position-and-orientation calculator 12, a shape measuring unit 13, and a robot communication unit 14. The sensor controller 3 also includes a storage device including an algorithm database 15 and a script database 16.

The external controller 104 includes a selector (selecting means) 21, a specification input unit (specification input means) 22, an algorithm setter (algorithm setting means) 23, a script selector (script selecting means) 24, an algorithm creator (algorithm creating means) 25, and an algorithm execution display (algorithm execution display means) 26 as functional elements.

The algorithm setter 11 determines (sets) a calculation procedure (algorithm) for calculating the positions and orientations of the workpieces W on the basis of a command from the external controller 104.

The position-and-orientation calculator 12 detects the positions and orientations (directions) of the workpieces W in the container 102 on the basis of the algorithm set by the algorithm setter 11 and the detection results obtained by the camera 1 and the laser distance sensor 2.

The information regarding the detected positions and orientations of the workpieces W is transmitted to the external controller 104, and is also transmitted to the robot controller 105 through the robot communication unit 14. The robot controller 105 operates the robot 101 on the basis of the information regarding the positions and orientations of the workpieces W.

The algorithm database 15 stores various calculation procedures (algorithms) for detecting the positions and orientations of the workpieces W on the basis of the detections results obtained by the sensor unit 103. The algorithms are stored in association with shape patterns that are suitable for the respective algorithms. The algorithm database 15 stores pre-scan algorithms for detecting the position and orientation of each workpiece W on the basis of shape characteristics of the detection objects that are stored in advance.

The shape patterns are the patterns of the shapes of the workpieces W that serve as the detection objects. For example, the shape patterns may include a pattern of, for example, a bolt that includes a large head portion and a helically threaded columnar portion (type A) or a pattern of, for example, a bracket component that includes a planar portion having a characteristic shape (type B).

The script database 16 stores a plurality of types of scripts. The scripts are control procedures included in each of the algorithms stored in the algorithm database 15 and serve as elements of the algorithms.

The scripts correspond to processing methods for subjecting the detection results obtained by the laser distance sensor 2 to processes such as an edge detection process, various filter processes, a labeling process, a loop process, and a branching process.

A recognition algorithm for detecting the positions and orientations of the workpieces W on the basis of the detection results obtained by the laser distance sensor 2 is formed by combining the above-described scripts in a suitable order or by individually executing the above-described scripts. The recognition algorithm is set to an algorithm suitable for conditions such as the shape of the workpieces W and the light environment of the container 102 by setting the combination of the scripts and the order of execution of the scripts.

The selector 21 causes the external controller 104 to display a shape-pattern selection screen, so that a user can select a shape pattern from the shape patterns of the workpieces W that are stored in advance.

The specification input unit 22 allows input of detailed specifications corresponding to the selected shape pattern. For example, if the selected shape pattern corresponds to the shape of a bolt, detailed dimensions such as the width of the head portion, the length of the helically threaded portion, etc., can be input. The specifications are not limited to length information, and may also include information of angles, curvatures, or the like.

The algorithm setter 23 transmits parameter changing information for the algorithm set by the algorithm setter 11 on the basis of the selection result obtained by the selector 21 and the input result obtained by the specification input unit 22.

The script selector 24 causes the external controller 104 to display a screen (script selection screen) through which a plurality of scripts can be selected from the scripts stored in the script database 16, and the user can input the combination of the desired scripts and the order of execution of the scripts by means of selection.

The algorithm creator 25 creates a new algorithm in accordance with the scripts selected by the script selector 24 and the order of execution of the scripts. The new algorithm is transmitted to the sensor controller 3 and is stored in the algorithm database 15.

The algorithm execution display 26 transmits the scripts included in the new algorithm, which is created in accordance with the scripts selected by the script selector 24 and the order of execution of the scripts, to the sensor controller 3 one step at a time or a plurality of steps at a time. Then, the algorithm execution display 26 causes the external controller 104 to display the result of execution of the scripts for a single step or a plurality of steps by the sensor controller 3. Accordingly, whether or not the desired operation is being performed by the scripts selected by the script selector 24 can be sequentially checked.

Figure 4:
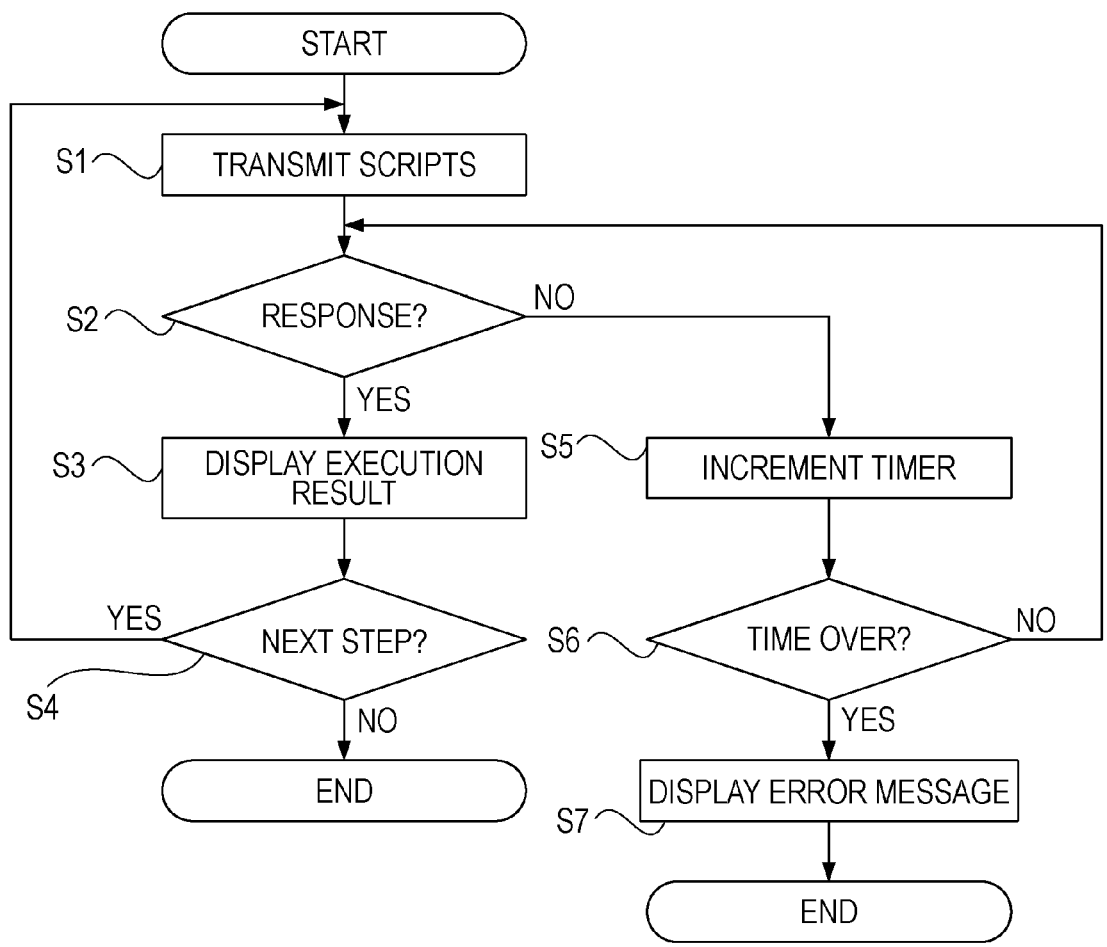
FIG. 4 is a flowchart of an algorithm execution process.

The operation will now be described with reference to FIG. 4. First, in step S1, scripts corresponding to a single step are transmitted to the sensor controller 3. Then, in step S2, the process waits for the result of execution of the scripts by the sensor controller 3 to be transmitted. When a response from the sensor controller 3 is received, the external controller 104 displays the results of execution of the scripts by the sensor controller 3 in step S3. Then, in step S4, it is determined whether or not there is a next step. In the case where, for example, there is only one step, the algorithm execution process is terminated.

In the case where the scripts of a plurality of steps are to be performed, the process returns to step S1, and the scripts for the next step are transmitted to the sensor controller 3. Then, the above-described processes are repeated until the scripts for all of the steps are executed.

If the response from the sensor controller 3 is not received in step S2, a timer (not shown) is incremented in step S5. Then, in step S6, it is determined whether or not the elapsed time has exceeded a predetermined time. If it is determined that the time is over in step S6, the display device included in the external controller 104 is caused to display a message that an abnormality has occurred in the algorithm execution process in step S7. Then, the algorithm execution process is terminated.

The robot system and the shape detection apparatus according to the present embodiment are structured as described above. Therefore, even when the workpieces W are replaced by workpieces having another shape, an algorithm suitable for the shape of the new workpieces can be created. Thus, a single robot system or a single shape detection apparatus can quickly and accurately detect three-dimensional shapes of the workpieces W, that is, the detection objects, having various shapes.

In addition, a manager of the robot system can easily select the shape pattern and the scripts through the shape-pattern selection screen and the script selection screen, respectively, in accordance with the characteristics of the shape of the workpieces W that are randomly arranged in the container 102 or the environment of the container 102 (for example, the environment regarding the required degree of robustness with respect to the detection result of the laser distance sensor 2 depending on, for example, the presence of disturbance light). Therefore, the combination of the scripts for creating the algorithm can be easily selected or changed, and a trial operation for creating an optimum algorithm can be easily performed. In addition, since the result of execution of each script is displayed, the manager can easily visually check whether the script is effective.

Although an embodiment of the present invention is described above, the shape detection apparatus and the robot system according to the present invention are not limited to the above-described embodiment, and various modifications are possible without departing from the scope of the present invention.

For example, it is not necessary to form the user controller and the robot controller separately from each other, and the user controller and the robot controller may be provided as functions of a single controller.

In addition, the shape detection apparatus may be used in various systems other than the robot system.

What is claimed is:

1. A shape detection system comprising:
   a distance image sensor configured to detect
      an image of a plurality of detection objects randomly arranged in a container, and
      distances from the distance image sensor to the detection objects;
   a sensor controller configured to detect a position and an orientation of each of the detection objects in the container on the basis of the image and the distances detected by the distance image sensor and a preset algorithm;
   an algorithm database including pre-registered shape patterns of the detection objects and detection algorithms corresponding to the pre-registered shape patterns, the pre-registered shape patterns and the detection algorithms being in association with each other;
   a script database including a plurality of scripts that serve as parts of the detection algorithms; and
   a user controller configured to select a detection algorithm from the algorithm database as the preset algorithm, the user controller comprising:
      a selector configured to allow a user to select a desired shape pattern from the pre-registered shape patterns of the detection objects in order to set, as the preset algorithm, one of the detection algorithms in the algorithm database on the basis of the desired shape pattern;
      a script selector configured to display the scripts in the script database and configured to allow the user to select desired scripts from the scripts and an order of execution of the desired scripts; and
      an algorithm creator configured to create a new detection algorithm on the basis of a combination of the desired scripts and the order of execution of the desired scripts, and configured to register the new detection algorithm to the algorithm database.

2. The shape detection system according to claim 1, wherein the user controller further comprises
   a specification input device configured to receive an input of a specification of the desired shape pattern, and
   an algorithm setter configured to set, as the preset algorithm, the one of the detection algorithms in the algorithm database on the basis of the desired shape pattern and the specification input through the specification input device.

3. The shape detection system according to claim 2, wherein the algorithm database includes pre-scan algorithms to detect the position and the orientation of each of the detection objects on the basis of shape characteristics of the detection objects, the shape characteristics of the detection objects being stored in advance, and
   wherein the sensor controller is configured to measure a three-dimensional shape of each of the detection objects on the basis of the image and the distances detected by the distance image sensor and is configured to output the three-dimensional shape to the user controller.

4. The shape detection system according to claim 2, further comprising:
   a robot configured to perform an operation for the detection objects arranged in the container; and
   a robot controller configured to control a movement of the robot on the basis of the position and the orientation of each of the detection objects detected by the sensor controller.

5. The shape detection system according to claim 1,
   wherein the user controller comprises
      an algorithm execution display device configured to transmit, when the new detection algorithm created by the algorithm creator is executed, the desired scripts included in the created new detection algorithm to the sensor controller one step at a time or a plurality of steps at a time, the algorithm execution display being configured to receive a result of execution of the desired scripts from the sensor controller, and configured to display the result of execution of the desired scripts.

6. The shape detection system according to claim 5, further comprising:
   a robot configured to perform an operation for the detection objects arranged in the container; and
   a robot controller configured to control a movement of the robot on the basis of the position and the orientation of each of the detection objects detected by the sensor controller.

7. The shape detection system according to claim 1, further comprising:
   a robot configured to perform an operation for the detection objects arranged in the container; and
   a robot controller configured to control a movement of the robot on the basis of the position and the orientation of each of the detection objects detected by the sensor controller.

8. The shape detection system according to claim 7,
   wherein the robot is configured to successively hold the detection objects that are randomly arranged in the container and is configured to cause the detection objects to be conveyed to a section where a next process is performed.

9. A shape detection system comprising:
   distance-image detection means for detecting
      an image of a plurality of detection objects randomly arranged in a container, and
      distances from the distance-image detection means to the detection objects;
   position-and-orientation detection means for detecting a position and an orientation of each of the detection objects in the container on the basis the image and the distances detected by the distance-image detection means and a preset algorithm;
   an algorithm database including pre-registered shape patterns of the detection objects and detection algorithms corresponding to the pre-registered shape patterns, the pre-registered shape patterns and the detection algorithms being in association with each other;
   selecting means for allowing a user to select a desired shape pattern from the pre-registered shape patterns of the detection objects in order to set, as the preset algorithm, one of the detection algorithms in the algorithm database on the basis of the desired shape pattern;
   a script database including a plurality of scripts that serve as parts of the detection algorithms;
   script selecting means for displaying the scripts in the script database to allow the user to select desired scripts from the scripts and an order of execution of the desired scripts; and
   algorithm creating means for creating a new detection algorithm on the basis of a combination of the desired scripts and the order of execution of the desired scripts, and for registering the new detection algorithm to the algorithm database.

10. The shape detection system according to claim 9, further comprising:

specification input means for receiving an input of a specification of the desired shape pattern, and algorithm setting means for setting, as the preset algorithm, the one of the detection algorithms in the algorithm database on the basis of the desired shape pattern and the specification input through the specification input means.

11. The shape detection system according to claim 9, further comprising:

an algorithm execution display means for transmitting, when the new detection algorithm created by the algorithm creating means is executed, the desired scripts included in the new detection algorithm to the sensor controller one step at a time or a plurality of steps at a time, receiving a result of execution of the desired scripts from the sensor controller, and displaying the result of execution of the desired scripts.

12. The shape detection system according to claim 9, further comprising:

robot means for performing an operation on the detection objects arranged in the container; and robot controlling means for controlling a movement of the robot means on the basis of the position and the orientation of each of the detection objects detected by the position-and-orientation detection means.

13. The shape detection system according to claim 12, wherein the robot means is for holding the detection objects that are randomly arranged in the container and for causing the detection objects to be conveyed to a section where a next process is performed.

* * * * *